Dec. 20, 1966   TATSUYA ICHIHARA   3,292,433
MEASURING DEVICE FOR THE MASS OR MASS FLOW OF GAS OR FLUID

Filed Nov. 15, 1963

INVENTOR.
TATSUYA ICHIHARA
BY
ATTORNEY.

United States Patent Office 3,292,433
Patented Dec. 20, 1966

3,292,433
MEASURING DEVICE FOR THE MASS OR MASS FLOW OF GAS OR FLUID
Tatsuya Ichihara, Nerima-ku, Tokyo, Japan, assignor to Honeywell Inc., a corporation of Delaware
Filed Nov. 15, 1963, Ser. No. 324,115
Claims priority, application Japan, Nov. 19, 1962, 37/50,803
3 Claims. (Cl. 73—209)

This invention relates to a device for measuring a mass flow and a mass of a fluid which passes through a duct; more particularly, it relates to a device for measuring a mass flow and a mass of a fluid by mounting a shielding plate in a taper tube and fixing said shielding plate onto a part of said taper tube by means of an elastic body and by measuring a flow velocity of the fluid jetting from an annular orifice provided between said taper tube and shielding plate at the time the shielding plate is moved with the flow of said fluid and is balanced with the tension of said elastic body.

The conventional principles of the device for measuring a mass flow and a mass of a fluid were that a mass flow and a mass of a fluid were measured by a flow velocity of a fluid jetting from an annular orifice between a taper tube and a float, which was generated when a float provided with a specific weight was put in said taper tube and said float rose up to a fixed place when it was set afloat in the fluid. However, since, strictly speaking, a float receives different buoyancy according to the density of each fluid, it is impossible in the conventional method to measure accurately a mass flow and a mass by means of the fluid.

In the present invention, in order to improve the defect described above, in measuring by means of a fluid, a shielding plate which operates as a float is fixed elastically onto the taper tube so that the float is constructed to have no connection with the buoyancy thereof. In this manner, it is possible to measure the mass flow and the mass of a fluid in the temperature range from −40° C. to +120° C. It is naturally possible to measure on gases in the aforementioned temperature range. Since a shielding plate is balanced at a fixed point in a taper tube by the tension of an elastic body, no error caused by the change of buoyancy results from the change of density of a fluid for the balance caused by its own weight. Accordingly, it is possible to measure the mass flow and the mass of not only gases in which the influences of buoyancy can be neglected but also of materials which change a buoyancy like fluids.

Figure 1:
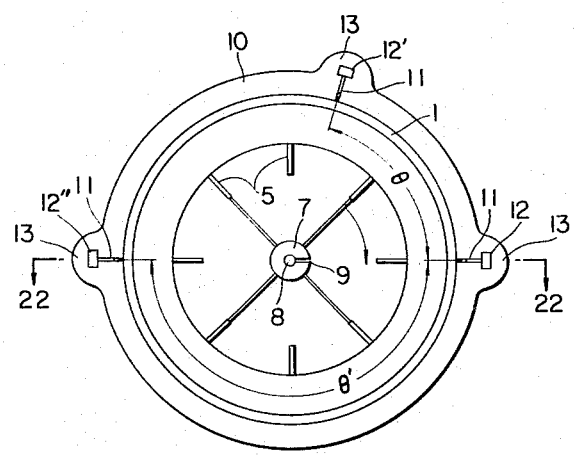
Figure 2:
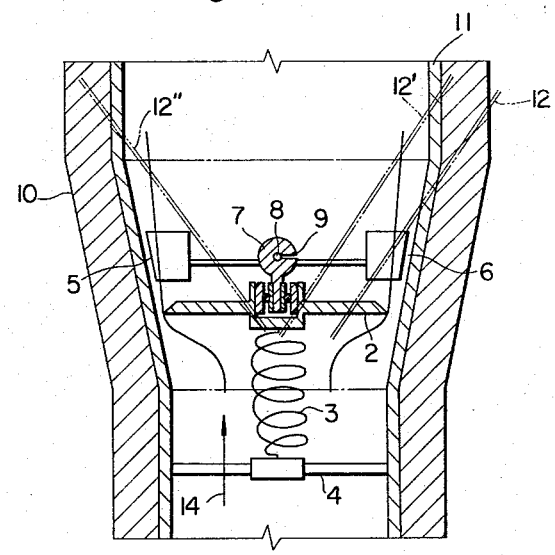

The object and advantage of this invention will become readily apparent from the following detailed description, in which:

FIG. 1 is a plan view showing one embodiment of a device for measuring a mass flow and a mass of a liquid or a gas provided in accordance with the present invention, and FIG. 2 is a cross section view cut along line 2—2 of the device as shown in FIG. 1.

In FIG. 1, in a metal taper tube 1, shielding plate 2 which prevents the fluid from flowing in said taper tube and bridge plate 4 which does not prevent the fluid from flowing are mounted, the center portion of said shielding plate 2 is connected to the center portion of said bridge plate 4 by means of an elastic body 3 which is made of a spring, and therefore said shielding plate 2 is caused to move in the direction of the flow due to the flow of the fluid to be measured in said taper tube 1. On the opposite side from said bridge plate of said shielding plate 2, rotatable blade 5 is mounted freely, said blade 5 has wings to be used for rotation due to the force of flow passing through an orifice which is formed by said taper tube 1 and said shielding plate 2. On the shaft of said blade 5, housing 7 containing radiant rays source 8 is mounted and the radiant rays emitted from said source 8 are irradiated in only one direction through hole 9. Seal 10 made of lead or an alloy thereof is mounted on the outside of said taper tube 1, on said seal 10, belt-like slits 11 are provided at three places separated at an angle of $\theta$ or $\theta'$ in coincidence with the shaft of said taper tube 1. Along said slits 11, radiant detectors 12, 12' and 12'' in a belt shape are mounted respectively. Seal 13 which is mounted in continuation to said seal 10 on the outside of said detectors 12, 12' and 12'' shields the radiant rays which leak from said slits.

The operation of the device as shown in FIG. 1 is as follows:

If the fluid in passage 6 to be measured is led within taper tube 1 along arrow 14 from the lower part thereof, shielding plate 2 is raised up to the place of $x$ which satisfies flow velocity in Formula 1 below and rests being balanced with elastic body 3, and said blade 5 is rotated at rotating velocity $\omega$ which is in proportion to flow velocity $v$.

$$v = C \sqrt{\frac{2gF}{m}} \quad (1)$$

Herein,

F is tension of the elastic body
C is flow outlet coefficient
g is acceleration of gravity
m is mass of the fluid in units of weight per unit volume
$F = K_1 a$
$K_1$ is a constant including a spring constant
$a$ is a fluid passing area at a point $x$ Formula 1 above is modified as the following Formula 2:

$$\frac{C\sqrt{2gK_1 a}}{v} = \sqrt{m} \quad (2)$$

A rotating velocity $\omega$ of the blade is assumed to be shown by the following formula.

$$\omega = K_2 v \quad (3)$$

Herein, $K_2$ is a proportional constant.

$$\frac{\sqrt{2gK_1} \cdot K_2 \cdot C\sqrt{a}}{\omega} = \sqrt{m} \quad (4)$$

If rotating angle $\theta$ between said two belt-like radiant rays detectors 12 and 12' is shown by Formula 5 below, Formula 4 above is modified as Formula 6 as shown below:

$$\theta \alpha \sqrt{2gK_1} \cdot K_2 \cdot C\sqrt{a} \quad (5)$$

$$\frac{\theta}{\omega} = t\alpha \sqrt{m} \quad (6)$$

Herein, $t$ is the time in which one point on the blade travel the rotating angle $\theta$ at rotating velocity $\omega$.

Accordingly, by measuring the time in which the blade travels said rotary angle $\theta$, mass $\sqrt{m}$ can be obtained.

Also, by modifying Formula 1 above and substituting Formula 3 above thereinto, following Formula 7 is obtained:

$$\frac{2gK_1 K_2 C^2 a^2}{\omega} = amv \quad (7)$$

Herein, if rotary angle $\theta'$ between two belt-like radiant rays detectors 12 and 12'' is shown by following Formula 8, Formula 7 above is modified as the formula as shown by following Formula 9:

$$\theta' \alpha 2gK_1K_2C^2a^2 \quad (8)$$

$$\theta'/\omega = t'amv \quad (9)$$

Herein, $t'$ is the time in which one point on the blade travels said rotating angle $\theta'$ at rotating velocity $\omega$.

Accordingly, by measuring the time in which the blade travels said rotating angle $\theta'$, mass flow rate $amv$ can be obtained.

As explained above, in this invention, by mounting a shielding plate in a taper tube through which a fluid flows and by measuring a flow velocity of the fluid which jets from an orifice, which is a gap formed by said taper tube and said shielding plate, the mass flow and the mass are measured. Since an elastic body is used in order to fix the shielding plate onto the taper tube and since the shielding plate is constructed in such manner that it is secured at a fixed point in the taper tube by an inherent tension of the elastic body, it is not secured by its own weight as in case of a conventional float, and therefore, even if the density of a fluid to be measured is changed, the buoyancy of the shielding plate does not affect the measurement and no error caused by change of the buoyancy occurs.

Also, since it is a mass flow meter, there is no flow rate measuring error caused by change of the density and it is possible to make accurate measurement with respect to gases, heavy oil, etc., the density of which change easily.

While a preferred embodiment of the present invention is disclosed, it is recognized that the scope of the present invention is not limited thereto and it is therefore intended that the scope of the present invention be defined by the scope of the appended claims.

What is claimed is:
1. An areal type meter comprising
   a vertical tapered passage through which a fluid is arranged to flow.
   a shielding plate located in said passage to form an annular orifice between said plate and said passage,
   means elastically fixing said plate within said passage against the flow of said fluid to cause the flow of said fluid to move said plate along the axis of said passage against the elastic force of said means,
   a blade mounted for rotation on said plate within said passage,
   means mounted on said blade to cause the latter to be rotated by the flow of said fluid through said orifice, and
   means conjointly responsive to the rotation and the axial position of said blade to measure a time period required for a point on said blade to rotate through an angle which is dependent upon the axial distance between said point on said blade and a point on said passage, the last-mentioned means including
   at least two elongated, belt-shaped detectors mounted along said passage in the general direction of the axis thereof and converging as they extend downwardly along said passage, said angle being the rotary angle between said detectors and decreasing progressively from the upper portion of said passage to the lower portion thereof, and
   an element carried by said blade and providing an effect which is detectable by said detectors so that said time period required for said blade to rotate through said angle, from a position in which only one of said detectors responds to said effect of said element to a position in which only the other of said detectors responds to said effect, is dependent conjointly upon the speed of rotation of said blade and the axial position of said blade along said passage.

2. A meter as specified in claim 1, wherein said angle is a function of the square root of the area of said orifice, whereby said time period is a measure of the mass of said fluid.

3. A meter as specified in claim 1, wherein said angle is a function of the square of the area of said orifice, whereby said time period is a measure of the mass flow rate of said fluid.

References Cited by the Examiner

UNITED STATES PATENTS

| | | | |
|---|---|---|---|
| 2,554,715 | 5/1951 | Mellett | 73—209 |
| 3,000,210 | 9/1961 | Faure-Herman | 73—231 |
| 3,131,559 | 5/1964 | Cooper | 73—194 |
| 3,169,397 | 2/1965 | Murray | 73—231 |

RICHARD C. QUEISSER, *Primary Examiner.*

E. D. GILHOOLY, *Assistant Examiner.*